March 27, 1934. G. C. MUELLER 1,952,453
PORTABLE CLAMP
Filed Feb. 13, 1932
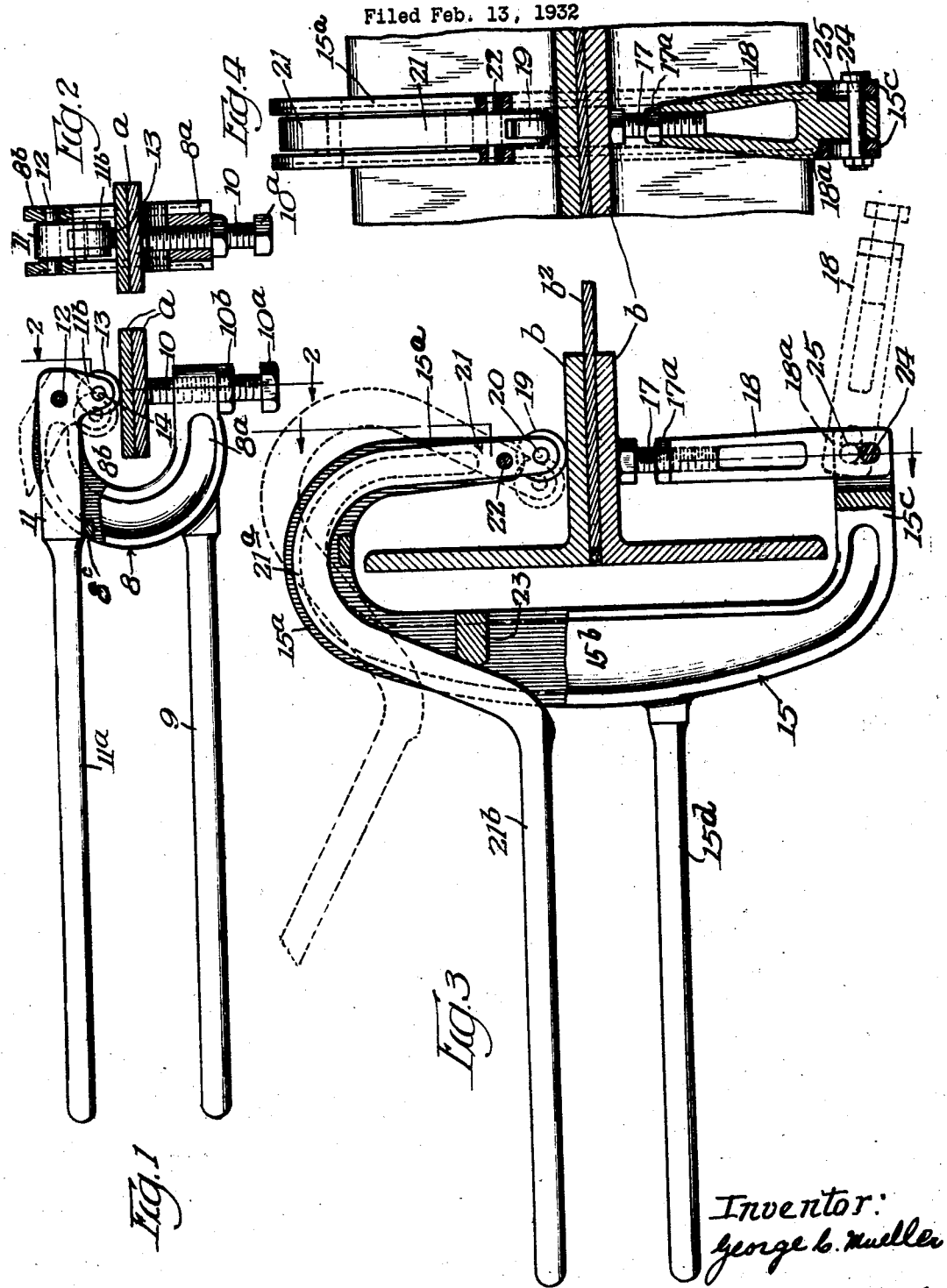
Inventor:
George C. Mueller
By Fred Gerlach
his attorney.

Patented Mar. 27, 1934

1,952,453

UNITED STATES PATENT OFFICE 1,952,453

PORTABLE CLAMP

George C. Mueller, Chicago, Ill.

Application February 13, 1932, Serial No. 592,713

4 Claims. (Cl. 113—99)

The invention relates to portable clamps used for temporarily securing parts together.

In fabricating structural steel, it is frequently desirable to clamp plates or bars together preparatory to welding them together or for other purposes, and it is desirable to expedite the clamping of the plates or bars particularly where large numbers of duplicate parts are to be fabricated.

The primary object of the invention is to provide a clamp which can be quickly operated by a self-locking lever to clamp the work, particularly where the work consists in fabricating a large number of similar structures. Heretofore, it has been customary to use screw-clamps which required considerable time in applying them to, and in their removal from, the work.

In general the improved clamp comprises a frame which fixedly carries an adjustable jaw or screw for engaging one face of the work and a self-locking lever having a coacting jaw which may be quickly swung into and out of position to clamp the work. As a result, when the adjustable screw or jaw is once set for clamping work of a given thickness, the lever may be quickly and repeatedly operated to clamp or release work of the same thickness without the necessity of operating a screw.

Another object of the invention is to provide a portable clamp which is generally of new and improved construction and may be manufactured at a low and reasonable cost.

Other objects of the invention and the various advantages and characteristics of the present clamp construction will be apparent from a consideration of the following detailed description.

The invention consists in the several novel features hereinafter set forth and more particularly defined by claims at the conclusion hereof.

In the drawing: Fig. 1 is a side elevation of a clamp embodying the invention, a portion of the frame being broken away for illustrative purposes. Fig. 2 is a section on line 2—2 of Fig. 1. Fig. 3 is a side elevation of another form of the invention, a portion of the frame being broken away. Fig. 4 is a section on line 4—4 of Fig. 3.

In Figs. 1 and 2 the invention is exemplified in a clamp which comprises a rigid bifurcated C-shaped frame or yoke 8 having a solid member 8ª and a bifurcated member 8ᵇ adapted to extend around the opposite faces of the work to be clamped, such, for example, as a pair of plates a; a handle 9 rigid with the frame 8; a screw 10 which is threaded to a socket in the frame-member 8ª and constitutes one of the gripping elements or jaws of the clamp; a lever 11, which is mounted between the sides of the frame-member 8ᵇ and is fulcrumed therein by a pin 12 which extends through said sides, and comprises a long handle 11ª approximately parallel to the fixed handle 9, and a short angular extension or arm 11ᵇ which carries a roller 13 which constitutes the second work-gripping element or jaw. The roller 13 is mounted in the bifurcated end of extension 11ᵇ on a pin 14 which extends transversely through said end. This roller is adapted to be swung into position opposite the screw 10 to coact with screw 10 in clamping the work. A stop 8ᶜ is provided in the frame 8 to normally limit the movement of the lever 11 to arrest and position the roller 13 at a predetermined point when the lever is swung to close the clamp. At this point the roller will be positioned substantially in or slightly across its dead-center position between the fulcrum 12 and the face of the work engaged by the roller, so that the lever will automatically lock or retain itself in position to clamp the work between screw 10 and roller 13.

In operating the clamp, the frame 8 is placed around the work, such as the plates a, while the lever 11 is in its open position, as indicated in dotted lines in Fig. 1, the screw 10 will be positioned adjacent one face of the work and the roller 13 adjacent its opposite face. When the lever is swung to its closed position, the roller 13 will engage the work and firmly clamp it between the screw 10 and the roller. The lever will be arrested by stop 8ᶜ and automatically retained in closed position by reason of the roller carrying arm having crossed its dead-center position between the work and its fulcrum. By adjusting the screw 10, the clamp may be adapted for work of different thicknesses and after the screw has once been set for work of a given thickness, it can be repeatedly used without requiring change in the adjustment of the screw. The latter is provided with a head 10ª at its lower end whereby it may be turned and a lock-nut 10ᵇ for securing it in its assigned position.

In Figs. 3 and 4, the invention is exemplified in a clamp which is adapted for clamping flanged beams or bars and plates together, such as angle-beams b, b' and plate b² so they can be welded together. In this form of the invention, the frame 15 is provided with a rigid bifurcated yoke-shaped member or loop 15ª, which is adapted to pass around the flange of one beam or bar and a back 15ᵇ. A screw 17, which serves as one of the gripping jaws, is carried by a standard 18, which is pivotally connected to the member 15c of the frame 15, so that it can be swung into operative position after the frame has been placed around the flanged beams which are to be clamped together. A handle 15d is rigid with the frame 15. A gripping roller 19 is carried by a pin 20 in one end of a lever 21 which is fulcrumed on a pin 22 held in the bifurcated member of the frame. The lever is looped, as at 21a, in said portion of the frame so it will pass around and clear the adjacent flange of the work, and is extended to form a handle 21b by which the roller can be operated into and out of closed position. A stop 23 limits the movement of the lever so that the arm of the lever which carries roller 19 will pass slightly across its dead center between the work and fulcrum-pin 22 so the lever will be automatically held in its locked position. In fabricating this class of work, it is necessary in most instances to place the clamp in position over the flanges of the beams, and to enable this to be done, the standard 18 is connected to the frame-member 15c by a pin 24 which extends through vertically elongated slots 25 in said member. The standard has shoulders 18a which are adapted to abut against the upper edge of the bifurcated end of frame-member 15c while the standard and its screw 17 are in operative position. The slots 25 and pivot pin 24 permit the standard 18 to be lifted and swung downwardly so the frame of the clamp can be passed around the flanges of the work, and so the screw 17 and standard 18 can be swung into operative position and into coacting relation with the roller 19 after the frame has been placed around the work. The screw 17 is threaded to the standard 18 so it can be adjusted in the standard 18 to adapt the clamp for work of different thicknesses. A lock nut 17a secures the screw in its adjusted position.

In operating this form of clamp, the frame 15 can be placed around the work while the standard 18 and screw 17 are lowered into position indicated by dotted lines in Fig. 3. While the handle 21b is raised, the standard 18 can be swung upwardly into position so its shoulders 18a will seat on the frame-member 15c. The handle 21b of lever 21 will then be swung until it is arrested by stop 23 at which time the arm of the lever which carries roller 19 will have crossed the dead-center, and roller 19 will clamp the parts of the work together against screw 17, and the lever will be self-retained in position to clamp the work. After the work has been fabricated, the lever 21 is swung to shift roller 19 to release the work. This will permit the frame of the clamp to drop sufficiently so there will be enough clearance between the screw 17 and the work to permit the standard 18 to be lifted so its shoulders 18a will clear the frame-member 15c. The standard will then be swung into its lowered position to permit the clamp to be removed from the work.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a portable clamp, the combination of a frame having a pair of forwardly extending members adapted to extend around the work to be clamped, a handle rigid with the frame and projecting rearwardly therefrom, an element adjustably mounted on one frame-member constituting a gripping jaw for engaging one face of the work, a one-piece lever carrying a roller at one of its ends which constitutes a gripping jaw for the other face of the work and having the other end thereof shaped to form, a hand extending in the same direction as the frame handle, a fulcrum for the lever carried by the other member of the frame and located between the roller and the lever handle so that the roller is caused to be brought into an operative or gripping position opposite the element when the lever handle is swung towards the frame handle, and stop-means for the lever whereby the portion of the lever between the fulcrum and the roller will be clamped between the fulcrum and the work so the jaws will be automatically secured in position to clamp the work.

2. In a portable clamp, the combination of a frame having a pair of forwardly extending members adapted to extend around the work to be clamped, a handle rigid with the frame and extending rearwardly therefrom, a standard having one end thereof connected pivotally to the outer end of one of the frame-members so that after placement of the members around the work it may be swung from an inoperative position in front of said one frame-member to an operative position wherein it extends towards and at right angles to the work, an element at the distal end of the standard and constituting a gripping jaw for the adjacent face of the work, a lever carrying an element at one of its ends which constitutes a gripping jaw for the other face of the work, and comprising a handle, a fulcrum for the lever between the gripping jaw carried thereby and the handle, and carried by the other member of the frame, and stop means for the lever whereby the portion of the lever between the fulcrum and the gripping jaw on the lever will be clamped between the fulcrum and the work so the jaws will be automatically secured in position to clamp the work.

3. In a portable clamp, the combination of a frame having a pair of forwardly extending members adapted to extend around the work to be clamped, a handle rigid with the frame and extending rearwardly therefrom, a standard having one end thereof connected pivotally to the outer end of one of the frame-members so that after placement of the members around the work it may be swung inwardly from an inoperative position in front of said one frame-member to an operative position wherein it extends towards and at right angles to the work, an element connected adjustably to the distal end of the standard and constituting a gripping jaw for the adjacent face of the work, a lever carrying an element at one of its ends which constitutes a gripping jaw for the other face of the work, and comprising a handle, a fulcrum for the lever between the gripping jaw carried thereby and the handle, and carried by the other member of the frame, and stop means for the lever whereby the portion of the lever between the fulcrum and the gripping jaw on the lever will be clamped between the fulcrum and the work so the jaws will be automatically secured in position to clamp the work.

4. In a portable clamp, the combination of a frame having a looped member at its upper end adapted to extend downwardly around the work to be clamped, and a substantially straight member at the lower end thereof positioned directly beneath the looped member and adapted to underlie the work, a standard connected to the outer end of the straight member by a pin and slot connection so that after proper placement of the two frame-members with respect to the work it may be swung upwardly under the work and then dropped downwardly a comparatively small distance, coacting shoulders between said one end of the standard and the outer end of the straight frame-member for holding the standard against swinging movement relatively to the frame after it has been dropped down following inward swinging movement thereof, an element connected adjustably to the distal end of the standard and constituting a gripping jaw for the under face of the work, a lever carrying an element at one of its ends which constitutes a gripping jaw for the top face of the work and comprising a handle, a fulcrum for the lever between the gripping jaw carried thereby and the handle, and carried by the looped member of the frame, and stop means for the lever, whereby the portion of the lever between the fulcrum and the gripping jaw on the lever will be clamped between the fulcrum and the work so the jaws will be automatically secured in position to clamp the work.

GEORGE C. MUELLER.